United States Patent [19]
Fontana

[11] 3,796,924
[45] Mar. 12, 1974

[54] ELECTRIC CONTROL SYSTEM FOR ACTUATING IN A PREDETERMINED SEQUENCE A PLURALITY OF ELECTRO-MAGNETIC RELAYS

[75] Inventor: Ludovico Fontana, Bari, Italy
[73] Assignee: Technical Arco Establishment, Schaan, Liechtenstein
[22] Filed: Dec. 29, 1972
[21] Appl. No.: 319,701

[52] U.S. Cl. .............................................. 317/140
[51] Int. Cl. ......................................... H01h 47/14
[58] Field of Search..................... 317/137, 139, 140

[56] References Cited
UNITED STATES PATENTS
| | | | |
|---|---|---|---|
| 3,200,303 | 8/1965 | Maxwell.............................. | 317/139 |
| 3,521,130 | 7/1970 | Davis et al. ......................... | 317/139 |
| 3,710,200 | 1/1973 | Jones................................... | 317/137 |

*Primary Examiner*—L. T. Hix
*Attorney, Agent, or Firm*—Toren and McGeady

[57] ABSTRACT

An electric control device for activating, according to a predetermined sequence, a plurality of electromagnetic relays, comprising an electronic program-switch connected to the relays by means of only three conductors only, two of which provide control signals and the other being a common return. Suitable change-over switches are included, so that the electric pulses alternatively sent through the program-switch onto the two control conductors, give rise to the sequential activation of said relays. The program-switch comprises: a transistor electronic circuit for generating controlling the frequency, duration and stability of the pulses, and a rotary relay, which when energized by a servo-relay, switches the pulses, alternatively, between the two control conductors. The program-switch also includes too a secondary electronic circuit for the control of the connection of the relays to the program-switch, and for adjusting the operation of the relays, each relay being connected to the return conductor through a change-over switch acted on by the preceding relay.

10 Claims, 5 Drawing Figures

ELECTRIC CONTROL SYSTEM FOR ACTUATING IN A PREDETERMINED SEQUENCE A PLURALITY OF ELECTRO-MAGNETIC RELAYS

The present invention relates to a device for acting sequentially activating a plurality of electro-magnetic relays by means of three only conductors.

The control may be carried out either manually or automatically by means of a suitable program-switch.

The electric circuit connecting the relays, the electric circuit of the program-switch, as well as a practical embodiment of the program-switch itself, are clearly shown in the accompanying drawings wherein.

Figure 1:
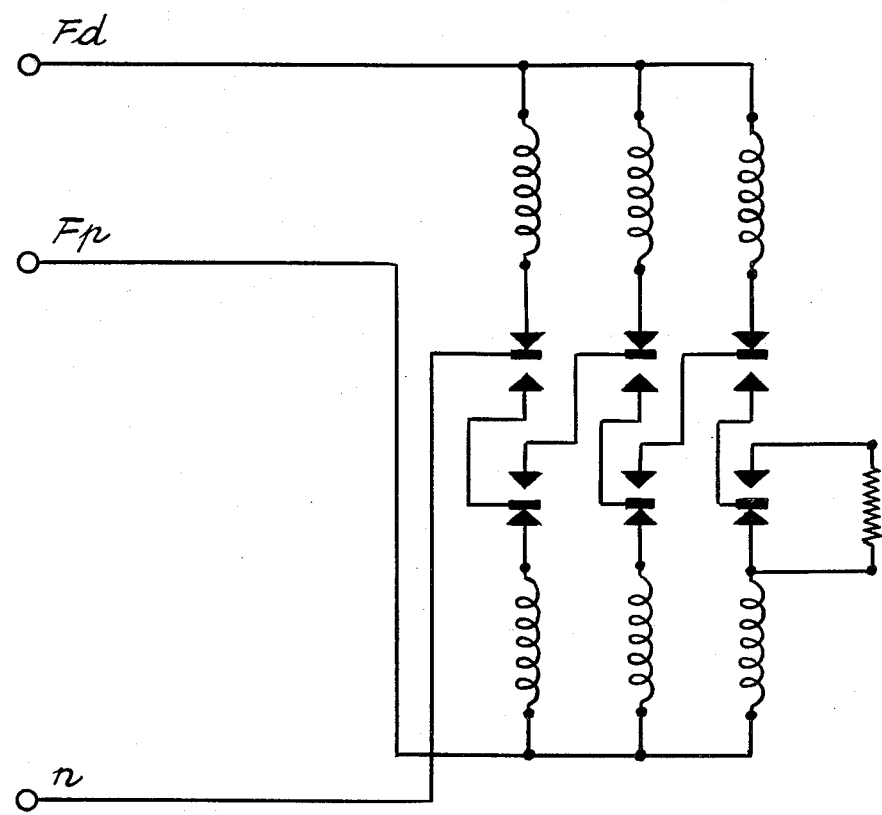
FIG. 1 shows the circuit diagram of the relays to be controlled.

FIG. 1 illustrates clearly the system resorted to for sequentially activating relays I, II, III, IV, V and VI. Conductor $n$), constitutes a common return for the relay control pulses. When an electric control pulse is applied to conductor $fd$, only relay I activated. No other relay can be energized inasmuch as only relay 1 is connected to the return conductor $n$ through its switch $cl$. When energized, relay 1 actuates switch $cl$ which carries out the change-over of the return conductor $n$ on the switch $c2$, connecting in this manner, relay II to return conductor $n$. It is apparent that even in the case where the electric pulse remains applied to conductor $fd$, no other relay is energized. Upon switching the control electric pulse from the conductor $fd$ to the conductor $fp$, only relay II energized, as it which is then the only relay connected to the return conductor $n$.

In this case too, with the electric pulse remaining on conductor $fp$, no other relay is energized in that only relay II is connected to the return conductor $n$ through its switch $c2$ and switch $cl$ of relay I.

In view of the above, the switching operation, sequentially carried out by the relays, is apparent.

The switching rate is determined by the rate at which the electric pulses are alternately applied to the two conductors $fd$ and $fp$. Thus, assuming the electric pulse is switched between conductors $fd$ and $fp$ once a second, one relay will be activated each second.

It is apparent too that if the electric pulses are simultaneously applied to both conductors $fd$ and $fp$, the relays will be energized in sequence automatically, at a rate determined only by the characteristic time of actuation of the individual relays.

From the above, it is apparent that by means of placing a suitable program-switch, switching in a manner described can be achieved automatically or manually.

In the case of an automatic control, when the changing-over rate is established, activation of the relays takes place continually and automatically. In the case of a hand control there a relay activated every time the voltage pulse is manually switched from one conductor to the other.

Figure 3:
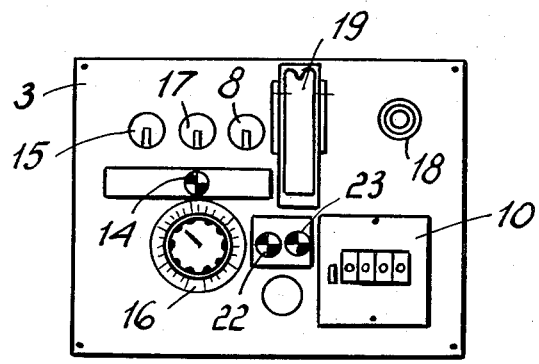
FIGS. 3, 4 and 5 show the three views of the program-switch.
Figure 5:
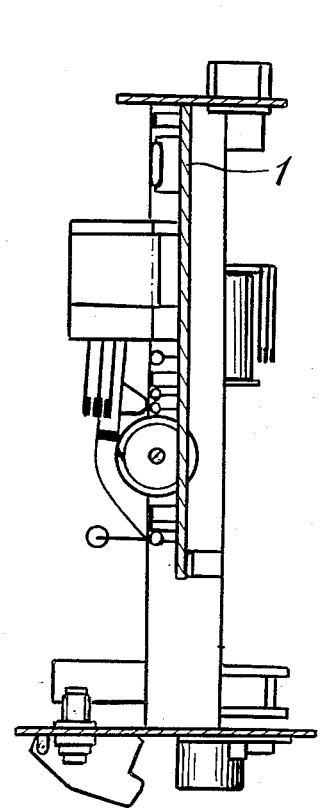
Figure 4:
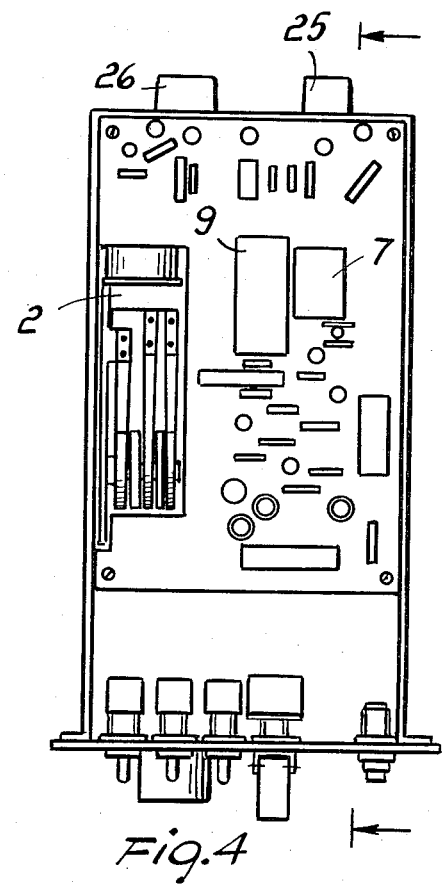

The program-switch, illustrated in FIGS. 3, 4 and 5, comprises a transistor electronic circuit which serves to generate electric pulses, according to the rate desired.

Generally the duration of each pulse is about 100 msec, whereas the time interval between a pulse and the following one can vary from a minimum value as of 200 msec to a few seconds, or more.

The electronic transistor circuit illustrated in FIGS. 3 to 5 is made up of a support member 1 of insulating material on which there is placed a printed circuit which effects the connection of all the components which make up the circuit including; a rotary relay 2 (FIG. 4), a control board 3 (FIG. 3): and the connectors 25 and 26 for connecting the power supply and the equipment fitted with the relays to be sequentially controlled, respectively.

Figure 2:
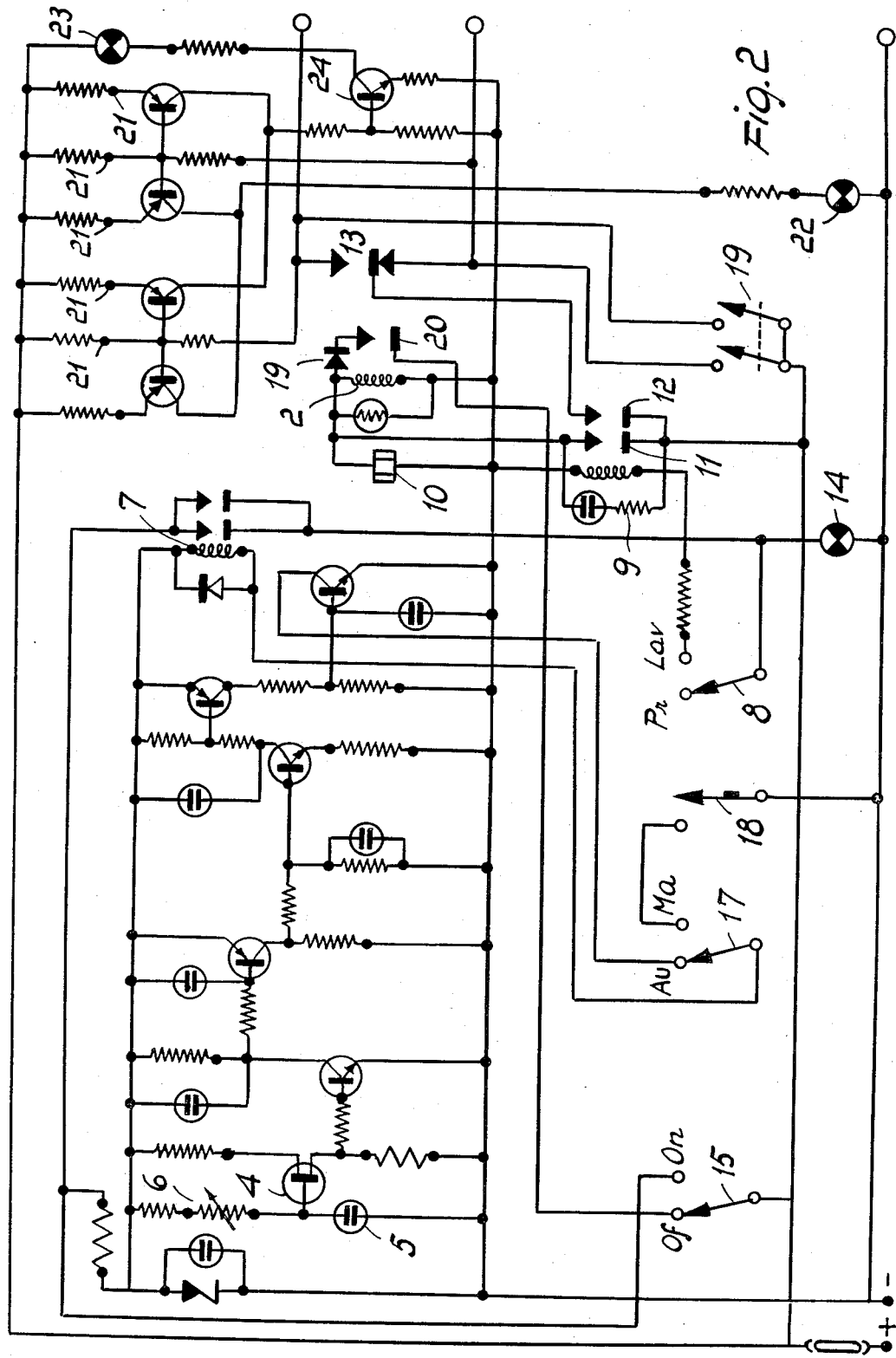
FIG. 2 shows the circuit of the program-switch.

The operation is as follows: A unijunction transistor 4 (FIG. 2) generates current pulses according to a rate which is determined by the capacity of a capacitor 5 and the resistance of a potentiometer 6.

The current pulses are amplified, adjusted and stabilized through the successive electronic circuit and eventually they go to operate the relay 7, which, in turn, acts on the relay 9 when the change-over switch 8) is located in the "LAV." (work) position.

The energized relay 9, upon closing its contact 11, transmits a pulse to the coil of the rotary relay 2 and to the coil of the blow counting relay 10 whilst the contact 12 sends a pulse onto the central pole of the exchange contact 13 of the rotating relay 2.

The circuit shows clearly that depending on the position of the exchange contact 13, the pulses are coupled onto conductor $fd$ or onto conductor $fp$. Naturally, the rotary relay 2 advances a step forward when its coil receives a pulse. Therefore at each pulse there is a change-over of the contacts 13 and accordingly, there the pulse is switched from one condutctor to the other. When the change-over switch 8 finds itself in the position "PR" - (Test), the pulse transmitted from the relay 7 energizes the signal lamp 14 only.

The program-switch starts to operate by shifting of the switch 15 to the ON position. In case switch 17 is positioned in the position "AUT" (AUTOMATIC), the electronic circuit will control relay 7 and the rate of the pulses will be monitored by the flashing of the signal lamp 14. The rate of the pulses may be modified by means of knob 16, (FIG. 3) which controls potentiometer 6. If the switch 17 is positioned in the position "MANUALE" (MANUAL), the signal lamp will be lit every time the push-button 18) is acted on, inasmuch as each actuation of the push-button corresponds to a pulse.

The rotary relay 2 is furthermore fitted with two contacts 19 and 20 which serve to position it always in the same starting position. Indeed when the switch 15 is in the position "SPENTO" (PUT OUT) the power supply is connected to the coil of the rotary relay 2 through the two contacts mentioned above. Since the contact 20 is a cam contact, it is apparent that in a well defined position the contact opens and the coil of the rotary relay 2 is de-energized, producing the start positioning.

Shifting the switch 19) into the position "SBLOCCO" (RELEASE) pulses are simultaneously applied to the two conductors $fd$ and $fp$, activating the relays I to VI at their free-running frequency.

The program-switch may be furthermore provided with a second electronic circuit which is also equipped with transistors to signal of the fact that the electric connection to the relay group to be acted on has taken place (this is material in the case said group is accommodated in a movable equipment with regard to the program-switch) and the actuation of all relays has occurred. Indeed in the case where the apparatus is not connected to the program-switch, the resistance of the two conductors *fd* and *fp* with respect to the return conductor *n* is very high, and no current flows into the four transistors 21, and transistor 24, and accordingly, neither the red signal lamp 22 nor green signal lamp 23 will light.

In the case where that the apparatus is connected to the program-switch, the electric resistance of one of the two conductors *fd* or *fp* with regard to the return conductor *n* is equal to the coil resistance of a relay of the apparatus. In this case, current flows into the four transistors 21 and the transistor 24, and both signal lamps 22 and 23 light. In the case where the apparatus is connected to the program-switch and all the relays of the apparatus have functioned, there will be extant an electric resistance between one of the two conductors *fd* or *fp* and the return conductor *n* determined by the resistance *rl*. Because of this resistance, the current circulating into the transistors 21 is not enough to light the red signal lamp 22. However the current, suitably amplified by the transistor 24, will light the green signal lamp 23.

What I claim is:

1. An electronic control device for activating a plurality of relays in a predetermined sequence, comprising:
   a program switch connected to said relays by means of only three conductors, two of which couple control pulses to said relays, and the other of which provides a common return;
   said program switch including:
   a transistor circuit for generating and controlling the frequency, duration and stability of a train of pulses;
   a rotary relay for alternately coupling said pulses to one or the other of said two conductors;
   means, including a servo-relay, for coupling said transistor circuit to said rotary relay;
   means, including a secondary electronic circuit, for controlling the connection of said relays to said program switch and for adjusting the function of said relays;
   and means associated with each relay for activating the next relay in said sequence.

2. A control device, as claimed in claim 1, characterized in that the last relay in said sequence of the apparatus acts upon a change-over switch which inserts into the common return conductor a resistor fit to control a transistor in said secondary circuit which signals the end of the sequence.

3. A control device, as claimed in claim 1, characterized in that the program-switch includes means for varying the frequency of said pulse train.

4. A device as claimed in claim 6 characterized in that the rotary relay of the program-switch comprises two auxiliary electric contacts placed in such a manner that the start pulse, transmitted from the program-switch is always coupled onto the same control conductor.

5. A control device as claimed in claim 6, characterized in that the program-switch includes means having an electronic circuit for signalling whether the relays are connected to the program-switch and whether the sequence has ended.

6. A control system for successively actuating a plurality of electromagnetic relays, comprising an array of relays, a program switching circuit for generating control pulses, three and only three conductors connecting said switching circuit to said relays, two of said conductors coupling the control pulses from said switching circuit to said relays, the third conductor serving as a common return, each of said relays having transfer switch means for successively connecting each of said relays to said return conductor, said switching circuit generating and stabilizing and transmitting a train of control pulses to one or both of said two conductors so that successive control pulses activate a different one of said relays, said switching circuit including means for monitoring the connection between said switching circuit and said relays.

7. The control system as in claim 6, further comprising a resistor and a lamp, the transfer switch means of the last of the successively actuated relays connecting said resistor to said return conductor and causing said lamp to be illuminated.

8. The control system as in claim 6, wherein said program switching circuit includes means for varying the pulse rate of said control pulse train.

9. The system as in claim 6, wherein said program switch includes means for alternately applying control pulses to one or the other of the two conductors.

10. The system as in claim 6, wherein said program switch includes means for monitoring the operation of said relays and for indicating that proper operation of said relays has taken place.

* * * * *

UNITED STATES PATENT OFFICE
CERTIFICATE OF CORRECTION

Patent No. 3,796,924     Dated March 12, 1974

Inventor(s) Ludovico Fontana

It is certified that error appears in the above-identified patent and that said Letters Patent are hereby corrected as shown below:

In the heading of the patent, insert

--[30]     Foreign Application Priority Data

January 28, 1972 Italy...............2105-A/72--

Signed and sealed this 13th day of August 1974.

(SEAL)
Attest:

McCOY M. GIBSON, JR.                C. MARSHALL DANN
Attesting Officer                   Commissioner of Patents